Dec. 2, 1941.   H. L. CROSBY   2,264,299
INSERTED TOOTH CUTTER
Filed Sept. 14, 1938
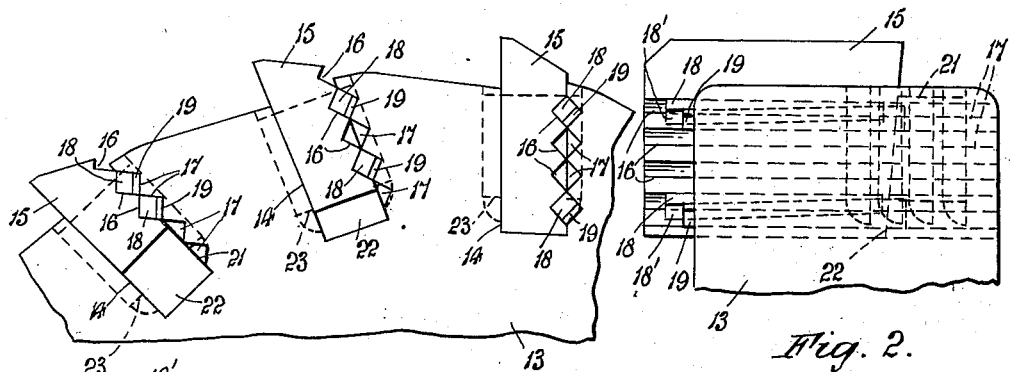
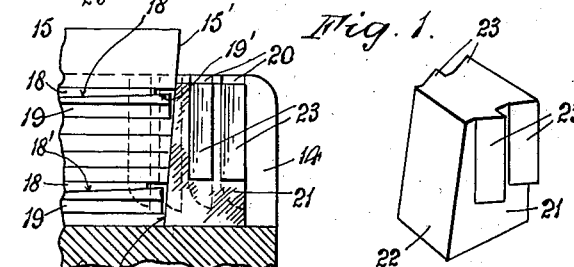
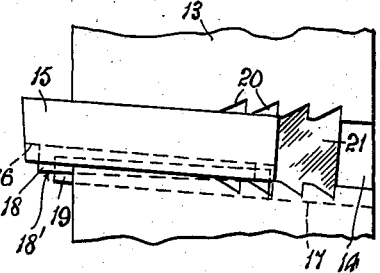
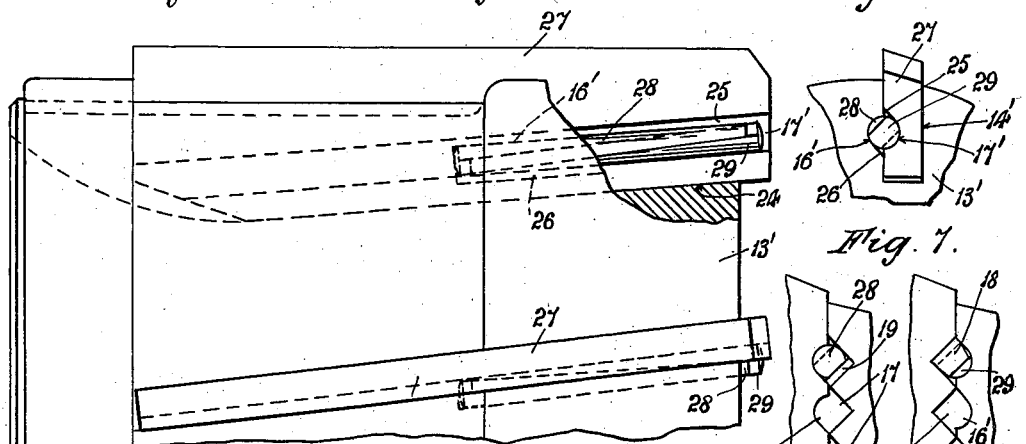
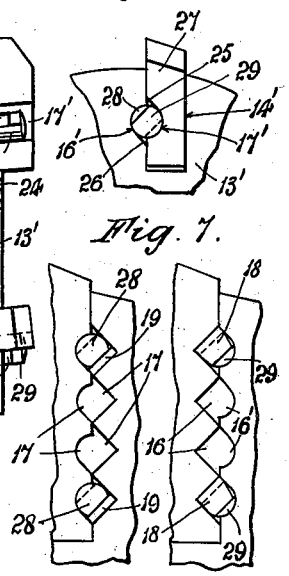
Harold. L. Crosby.
INVENTOR.
BY Manley Lightfoot.
ATTORNEY.

Patented Dec. 2, 1941

2,264,299

UNITED STATES PATENT OFFICE 2,264,299

INSERTED TOOTH CUTTER

Harold L. Crosby, Rockford, Ill., assignor to Maurice Robbins

Application September 14, 1938, Serial No. 229,930

14 Claims. (Cl. 29—105)

This invention relates to inserted tooth reamers, cutters, and similar tools wherein the cutting teeth are accommodated in slots formed in the tool body, and although the invention is primarily intended for use with such devices wherein the said teeth are radially, axially, or otherwise adjustable in the body it may be employed with advantage where such teeth are merely intended to be replaceable and are not necessarily capable of adjustment.

The principal object of the invention is to provide a very simple and effective two-piece wedging means for locking teeth in the slots or in positions of adjustment therein (although in some of its aspects it does not preclude the use of a one-piece locking pin or dowel), and to provide for such locking in a manner which offers a minimum disturbing effect to the adjustment or desired position of the teeth in their slots; and to further provide a locking means which may be readily released when desired without having objectionable self-releasing properties under the influence of vibration or forces to which the tool may be subjected when in use.

A still further object is to provide such locking means of a type lending itself to very satisfactory use in connection with serrated type adjustable teeth wherein the said teeth are progressively stepped outwardly of their grooves to increase their effective diameter, or to permit of their being ground back to a predetermined effective diameter, by the re-matching of serrations in the teeth with cooperating serrations in the adjacent side walls of their slots.

Still further, the said means of locking is adaptable to teeth adjustably supported in slots the beds of which slots are angularly inclined to the axis of the tool as is common, for instance, in variable and adjustable reamers, the locking means admitting of the ready relocking of the teeth in any of their positions of adjustment over the said inclined beds of the slots.

The invention also contemplates the provision, where desirable, of mechanical means for effecting the related locking movement of the two parts of the locking means.

Still further means, auxiliary to the aforesaid locking means, for securing an adjustment of the teeth in a second direction in addition to the adjustment in which the teeth are primarily locked by said means, is contemplated and referred to herein, and such auxiliary means may form the sole actual adjustment where no adjustment in another direction is desired, said locking means securing the tooth in the adjustment afforded by the said auxiliary means and forming the guide for such adjustment.

Still further objects and advantages inherent in the improved locking means, or in the construction or operation of the invention as it may be carried into effect, will become apparent as the invention is hereinafter further disclosed.

In carrying the invention into effect, I may provide, in a cutting tool having inserted teeth mounted in slots in the body of the tool, cooperating grooves in the side wall of each tooth and in the opposed side wall of the slot, and a two-piece locking member in the form of opposed and preferably attenuated matching wedges the engaging faces of which extend at an angle to the axis of the locking member, whereby when the two parts of the locking member are forcefully moved over each other in the direction required the cooperative wedge action will tend to expand the locking member in any desired direction to exert any desired force, angular or otherwise, on the wall of the tooth groove and the wall of the slot groove so that the tooth is effectively locked in the slot, its release being permitted only by deliberate relative movement of the parts of the locking means in the opposite direction to that employed in locking the device. All of which is more particularly described and ascertained hereinafter, by way of example, having reference to the accompanying drawing, wherein:

Figure 1 is a fragmentary end elevation of a cutting tool having adjustable inserted teeth provided with locking means embodying the said invention;

Figure 2 is a side elevation of the same;

Figure 3 is a fragmentary plan view of the same showing only one of the teeth;

Figure 4 is a similar view to Figure 2 with part of the tooth broken away and the tool body in vertical section to more clearly show the auxiliary tooth adjusting block or stop;

Figure 5 is a detail perspective view of the adjusting block;

Figure 6 is a fragmentary side elevation of an adjustable reamer with the body partly broken away and in section, showing the application of the improved locking means thereto;

Figure 7 is a fragmentary end elevation of the same showing only one tooth;

Figure 8 is a fragmentary detail elevation of the serrated tooth and body of an adjustable tool, illustrating a modified wedge arrangement of the locking means;

Figure 9 is a similar view to Figure 8, showing another wedge arrangement.

Similar characters of reference indicate similar parts in the several figures of the drawing.

Referring first to Figures 1 to 5. 13 indicates the body of a cutter provided with more or less radial 14 in which teeth 15 are inserted and, in Figure 1, the teeth are shown in three positions of radial adjustment; the right-hand tooth 15 being shown as fully inserted in its slot such as would be the case with a new unworn tooth, the central tooth being shown as partly withdrawn from its slot and having its cutting edge correspondingly ground back to the original effective radial dimension, whilst the left-hand tooth is shown as being still further withdrawn from its slot and still further ground back to the required extent, as will be well understood without further explanation.

In the illustrations of the drawing, such matters as tooth profile, rake, angle, and so forth are not taken into precise consideration as not being necessary to an understanding of the present invention.

The teeth 15 are shown as having serrations or grooves 16 formed in one of their side walls and in this example shown as running parallel to the base of the tooth although they are not necessarily so. The opposed side wall of each slot 14 in the body of the tool is also provided, in this example, with similar serrations or grooves 17 matching the serrations 16 of the teeth, as distinguished from interlocking therewith; and it will be seen that by moving any tooth radially inward or outward of its slot any set of serrations in the tooth may be brought into matching register with any set of serrations in the wall of the slot within the limits of movement permitted by the design as clearly indicated in the said Figure 1.

To lock the tooth in any one of these tooth-matching positions, I provide two-part dowels or locking means in the form of opposed wedge members 18 and 19, the meeting faces 18' and 19' of which extend longitudinally of the dowel and at a slight inclination to the axis thereof as clearly shown in Figure 4, the outer configuration of the said members being in this example squared to conform to the configuration of the V-shaped serrations into which they are inserted.

Of course, if only one serration in the tooth and in the wall of the slot be provided, as may be the case where no provision for radial adjustment of the tooth is required, a single dowel of the type referred to is used for each tooth, but where a number of such serrations are provided as in the instant example a plurality, in this case two, of such dowels are preferably used; a very desirable arrangement being to use a dowel in the outermost and in the innermost of the matching serrations as shown in Figure 1.

The preferred arrangement of the dividing plane of the two members of the dowel intersects the plane of the side wall of the tooth at a marked angle, which is illustrated as being substantially 45° in this case, so that when the two parts of the dowel are driven together the resultant expanding force is directed against the tooth and the body of the tool at a substantial angle to the tool radius. Thus, according to the direction this meeting plane of the members is caused to assume when the dowel is inserted in the tool, the expanding force of the dowel may be directed upwardly or downwardly against the serration walls of the tooth according to the force which the tooth is primarily intended to resist, where this is of consequence. However, in most cases, it makes little difference in actual practice which direction angularly this force be exerted as long as it suffices to solidly bind the tooth in its slot in whatever position may have been determined.

For adjustment of each tooth coaxially or substantially coaxially with the tool, where such adjustment is desired, the walls of the slot are shown as provided with serrations or grooves 20 of any suitable form and extending vertically of the slot, or substantially radially of the tool, and I have provided a block or stop 21 the rearwardly inclined face 22 of which abuts the correspondingly inclined rear end 15' of the tooth. This block is provided with laterally projecting lugs 23 adapted to be selectively engaged in one or other of the slots 20 according to the position of adjustment of the tooth 15 desired; and it will be noticed that in effecting such adjustment the two-part dowel 18, 19, forms a guide or key for the forward movement of the tooth and cooperates in that way with the said block in effecting the desired adjustment of the said tooth. It is understood, of course, that the dowel is loosened sufficiently for such adjustment by movement of the parts thereof in an anti-wedging direction, and that after the adjustment is determined the parts of the dowel are again driven together to lock the tooth in the adjusted position.

It will also be seen that the radial adjustment of the tooth by the re-matching of the serrations 16 and 17, together with the forward adjustment of the tooth on the dowels and positioning by means of the block 21 affords a tooth adjustment in a direction at an angle to the axis of the tool, which direction is the resultant of the said two adjustments. Further, the rearward inclination of the meeting faces 15' of the tooth and 22 of the stop, results in the effectual locking of the stop against withdrawal from the slot 14 when such surfaces are in contact.

The invention lends itself to ready use with adjustable or expansible tools such as reamers, as indicated in Figures 6 and 7, wherein 13' is the reamer body the slots 14' of which may have inclined beds 24 in accordance with the common practice whereby forward movement of the teeth 27 in the slots will be accompanied by radial adjustment of the said teeth in the well known manner.

As has been previously explained, the dowel grooves or serrations are not necessarily of a square configuration, and, in the example Figures 6 and 7 I show a single groove 16' of a generally semi-circular configuration in the wall of the slot 14' and a similar semi-circular groove 17' in the opposed wall of the tooth or blade, the upper margin of the groove 17' being relieved as by chamfering at 25 and the lower margin of the groove 16' similarly relieved as at 26. This is merely to permit free expansion of the dowel pin in its locking movement of the parts thereof. The dowel pin in this case is composed of the two parts 28 and 29 differing only from the previously described dowel pin in that its outer surfaces are of cylindrical form to conform to that of the walls of the grooves in which it is inserted.

The said dowel pin 28, 29, and the grooves 16' and 17' have their axes disposed at an angle to the axis of the tool corresponding to the angular direction in which the tooth is intended to move in its adjustment, as determined by the direction of the slot and inclination of the bed of the slot;

but it should be noted that in this case the bed of the slot is not necessarily solely charged with the guidance of the tool in such angular direction, as the said dowel may be operative to partially or solely effect such guidance. In the latter case, the bed of the slot may not necessarily conform to or assist such guidance at all and may actually be entirely free of the base of the tooth.

Figures 8 and 9 show how the square wedge 17 or 18 of Figures 1 to 4 may be used with the round wedge 28 or 29 of Figures 6 and 7, to form a dowel if desired. In Figure 8 the rounded grooves are formed in the tooth and the square grooves in the wall of the slot, whereas, in Figure 9 the condition is reversed and the square grooves are formed in the tooth and the rounded grooves in the wall of the slot.

This invention may be developed within the scope of the following claims without departing from the essential features of the said invention and it is desired that the specification and drawing be read as being merely illustrative and not in a limiting sense except as necessitated by the prior art.

What I claim is:

1. In a tool of the type described, in combination, a slotted body, a tooth inserted therein, the opposed sides of said tooth and said slot being provided with matching grooves, and a two-piece dowel accommodated mutually by the matching grooves, the parts of the dowel being in the form of opposed wedges.

2. In a tool of the type described, in combination, a slotted body, a tooth inserted therein, the opposed sides of said tooth and said slot being provided with matching grooves, and a two-piece dowel accommodated mutually by the matching grooves, and parts of the dowel being in the form of opposed wedges, the meeting faces of said wedges being disposed on a plane at an angle to the opposed sides of said tooth and said slot.

3. In a tool of the type described, in combination, a slotted body, a tooth inserted therein, the opposed sides of said tooth and said slot being provided with a series of matching grooves, and a two-piece dowel accommodated mutually by one of the matching grooves, parts of the dowel being in the form of opposed wedges.

4. In a tool of the type described, in combination, a slotted body, a tooth inserted therein, the opposed sides of said tooth and said slot being provided with a series of matching grooves, and a plurality of two-piece dowels accommodated mutually by a plurality of the said matching grooves, the parts of each dowel being in the form of opposed wedges.

5. In a tool of the type described, in combination, a slotted body, a tooth inserted therein, the opposed sides of said tooth and said slot being provided with a series of matching grooves, and a two-piece dowel accommodated mutually by one of the matching grooves, parts of the dowel being in the form of opposed wedges, the meeting faces of said wedges being disposed on a plane at an angle to the opposed sides of said tooth and said slot.

6. In a tool of the type described, in combination, a slotted body, a tooth inserted therein, the opposed sides of said tooth and said slot being provided with a series of matching grooves, and a plurality of two-piece dowels accommodated mutually by a plurality of the said matching grooves, the parts of each dowel being in the form of opposed wedges, the meeting faces of said wedges being disposed on a plane at an angle to the opposed sides of said tooth and said slot.

7. In a tool of the type described, in combination, a slotted body, a tooth inserted therein, the opposed sides of said tooth and said slot being both provided with one or more matching grooves extending substantially coaxial of said tool, one or more dowels in said matching grooves for guiding said tooth in coaxial adjustment, said dowel or dowels locking said tooth upon being driven home, and a stop member adjustable in said slot to abut the rear end of said tooth, said stop and said slot being provided with selective interlocking means affording the adjustment of said stop.

8. In a tool of the type described, in combination, a slotted body, a tooth inserted therein, the opposed sides of said tooth and said slot being provided with matching grooves extending substantially coaxial of said tool, a two-piece dowel accommodated by said matching grooves, parts of said dowel being in the form of opposed wedges whereby said parts in a nonwedging position operate as a coaxial guide for said tooth and in a wedging position lock said tooth in coaxial adjustment, and a stop member adjustable in said slot to abut the rear end of said tooth and said slot being provided with selective interlocking means affording adjustment of said stop.

9. In a tool of the type described, in combination, a slotted body, a tooth inserted therein, both sides of said tooth and said slot being provided with a series of matching grooves extending substantially coaxial of said tool, a plurality of two-piece dowels accommodated by a plurality of said matching grooves, and a stop member adjustable in said slot to abut the rear end of said tooth, said stop and said slot being provided with selective interlocking means affording adjustment of said stop.

10. In a tool of the type described, in combination, a slotted body, the bed of the bolt being inclined to the axis of the tool, a tooth inserted in the slot, the base of the tooth being inclined in conformity with the bed of the slot, said tooth and said slot being provided with matching grooves extending substantially in the direction of the bed of the slot, and a two-piece dowel accommodated mutually by the matching grooves, parts of the dowel being in the form of opposed wedges.

11. In a tool of the type described, in combination, a slotted body, a tooth inserted therein, the opposed sides of said tooth and said slot being provided with matching grooves extending at an angle to the axis of the tool, and a two-piece dowel accommodated mutually by the matching grooves, parts of the dowel being in the form of opposed wedges.

12. In a tool of the type described, in combination, a slotted body, the bed of the slot being inclined to the axis of the tool, a tooth inserted in the slot, the base of the tooth being inclined in conformity with the bed of the slot, said tooth and said slot being provided with matching grooves extending substantially in the direction of the bed of the slot, and a two-piece dowel accommodated mutually by the matching grooves, parts of the dowel being in the form of opposed wedges, the meeting faces of said wedges being disposed on a plane at an angle to the opposed sides of said tooth and said slot.

13. In a tool of the type described, in combination, a slotted body, a tooth inserted therein, the opposed sides of said tooth and said slot being provided with matching grooves extending at an angle to the axis of the tool, and a two-piece dowel accommodated mutually by the matching grooves, parts of the dowel being in the form of opposed wedges, the meeting faces of said wedges being disposed on a plane at an angle to the opposed sides of said tooth and said slot.

14. In a tool of the type described, in combination, a slotted body, a tooth inserted therein, the opposed sides of said tooth and said slot being both provided with one or more matching grooves extending substantially coaxial of said tool, one or more dowels in said matching grooves for guiding said tooth in coaxial adjustment, said dowel or dowels locking said tooth upon being driven home, and a stop member adjustable in said slot to abut the rear end of said tooth, said stop and said slot being provided with selective interlocking means affording the adjustment and radial removal of said stop, the rear end of said tooth being conformed to overlap the opposed face of said stop to interrupt its said radial removal when said tooth and said stop are in abutment.

HAROLD L. CROSBY.